United States Patent Office 3,487,903
Patented Jan. 6, 1970

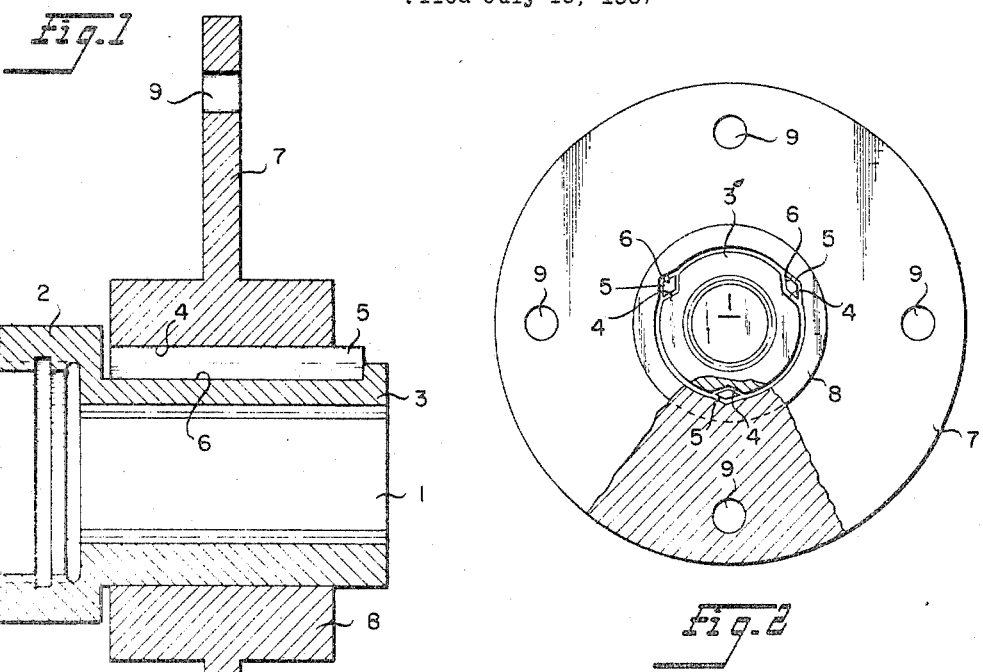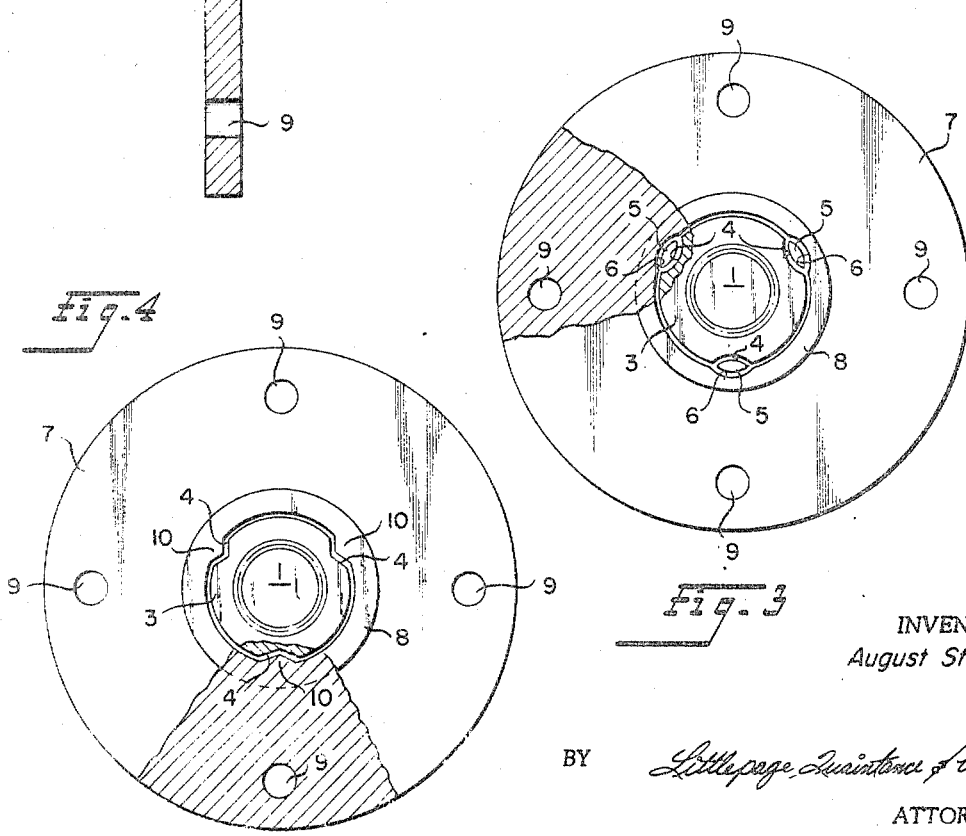

3,487,903
TORQUE LOCKED SPLINE FOR CLUTCH
August Stickan, Malerstrasse 72, Bremen, Germany
Filed July 19, 1967, Ser. No. 654,451
Int. Cl. F16d *11/00, 13/52, 1/06*
U.S. Cl. 192—107         4 Claims

ABSTRACT OF THE DISCLOSURE

A hub for a clutch disc is formed of concentric parts or sleeves, said parts having opposed grooves to receive pins, or complementary ribs and grooves, which form radially inclined engaging surfaces to provide a radial component of the driving force and prevent relative displacement of said parts.

---

The invention relates to a clutch disc for vehicles, whereby the hub of said clutch disc consists of two concentric hub parts of which the outer part is rigidly connected to the coupling or clutch disc, while the inner part is attached to the shaft of the coupling.

The German Patent No. 844,542 shows a clutch disc for vehicles whose hub contains a free wheeling mechanism. The hub consists, for this purpose, of two concentric parts, of which the outer part is rigidly connected to the clutch disc, while the inner part, which is provided with a centrally notched bore for the reception of the drive shaft, is further provided, in the well-known manner, with eccentrically arranged circumferential slots for the positioning of the free wheeling rollers.

While this arrangement achieves a free wheeling action to facilitate the control of the clutch, the actual purpose, forming the basis of the present invention, is to prevent axial stresses which result from the shifting of the clutch disc on the gearing of the drive shaft, which has a tendency to flatten out somewhat with the passage of time.

The invention consists, therefore, of a hub for a clutch disc for vehicles, consisting of two concentric parts of which the outer hub part is rigidly connected with the clutch disc, while the inner hub part is attached to the shaft of the coupling, inner part being provided on its outer cylindrical surface and the outer part on its inner cylindrical surface with complementary cam surface profiles. The outer part is provided on the inner cylindrical surface with axial cam or guide surfaces which in radial section are formed in the manner of an obtuse angle, or concave or convex, and which are arranged and constructed in such a manner that the outer part can be axially displaced or moved on the inner part in such a manner that when a torque arises between the inner part and the shaft, a power component is produced in radial direction which prevents an axial movement of the outer part on the inner part.

It is preferred that the cam or guide surfaces be formed by the protruding surfaces of wedging pins inserted in grooves of the outer part.

In this manner there is produced by the torque, which is transferred through the coupling, a power component in radial direction which positively prevents further shifting of the clutch disc.

Examples of construction of the object of the invention are represented in the drawings, and there is shown in FIGURE 1 a longitudinal section through the structural parts which are mounted on the shaft of the coupling;

FIGURE 2 a partially sectionalized side view of the first example of construction;

FIGURE 3 a partially sectionalized side view of a second example of construction;

FIGURE 4 a partially sectionalized side view of a third example of construction.

FIGURE 1 shows the shaft 1 of the coupling, which is in driving connection with an interior gearing of the inner part 3, which is not shown in detail. The inner part 3 is provided with a shoulder 2, by means of which the inner part can be secured against shifting relative to the shaft of the coupling. The inner part 3 is provided on its outer side with grooves 4 which receive the inner half of pins 5 for the transfer of the torque to the outer part 8, while the other half of the pins is arranged in corresponding grooves 6 in the outer part 8 which is provided with a flange 7 for the clutch disc (not shown). Holes 9 are provided in the flange 7 for the attachment of the clutch disc.

As is shown in FIGURES 2 and 3, the grooves 4 and 6 can be constructed in a rectangular or rounded form, depending upon the type of pins 5 that are used. The third example of construction, represented in FIGURE 4, shows that, instead of the pins, mole cam surface protrusions 10 are formed on the inner cylindrical surface of the outer part. Of course, it is also possible to form the protrusions on the outer side of the inner part and corresponding female cam surface grooves on the inner cylindrical surface of the outer part. The pins 5 and the grooves 4, and 6, and/or the protrusions 10 and the grooves 4 are always formed in such a manner that, when a torque arises between the hub parts in either direction, a power component in radial direction is produced which prevents an axial shifting or movement of the two parts. By means of a corresponding construction of the pins, grooves and protrusions it is, thereby, also possible to select a different size of the power component in the two directions of movement.

I claim:
1. A wedging spline mounting for a vehicular clutch disc comprising:
a hub having inner and outer concentrically disposed parts,
a flat radially-extending flange rigidly connected to the outer part, the flange being adapted for having clutch friction facings attached to opposite sides thereof, and
a power shaft connected to the inner parts,
the inner part and the outer part having mutually opposed cylindrical surfaces radially spaced apart from each other so as to be relatively rotatable, the mutually opposed cylindrical surfaces defining at spaced intervals thereon complementary pairs of axially extending cam surfaces radially spaced from each other, the cam surfaces being substantially symmetrical on both parts and extending from the cylindrical surfaces to maximum radial displacements from the cylindrical surfaces, and the cam surfaces extending generally circumferentially in both directions from maximum radial displacements thereof, circumferential extensions of the cam surfaces in each direction being greater than radial extensions of the cam surfaces, whereby the inner and outer parts may be axially moved with respect to each other and the inner and outer parts may be relatively angularly displaced to a slight degree in either direction, and whereby angular displacement causes locking of the cam surfaces, thus preventing further relative angular movement in the same direction and preventing relative axial movement of the parts.

2. The wedging spline mounting for a vehicular clutch disc of claim 1 wherein each complementary pair of cam surfaces comprises a male cam surface on one part extending into a female cam surface on the other part.

3. The wedging spline mounting for a vehicular clutch disc of claim 2 wherein female cam surfaces are in the inner part and male cam surfaces are in the outer part.

4. The wedging spline mounting for a vehicular clutch disc of claim 1 wherein cam surfaces of each pair extend oppositely away from each other, and further comprising wedging pins disposed in the cam surfaces and spaced from walls of at least one cam surface of each pair of complementary cam surfaces and extending beyond imaginary continued cylindrical surfaces of both parts in areas of the cam surfaces.

References Cited

UNITED STATES PATENTS

| 174,324 | 2/1876 | Turner | 192—110 |
| 1,164,531 | 12/1915 | Kwis | 192—70.2 |
| 2,926,765 | 3/1960 | Heid | 192—45.1 X |
| 3,256,967 | 6/1966 | Heid | 192—107 |

FOREIGN PATENTS

| 357,967 | 1/1906 | France. |

BENJAMIN W. WYCHE III, Primary Examiner

U.S. Cl. X.R.

192—70.2; 287—53